US012272355B2

(12) United States Patent
Poddar

(10) Patent No.: US 12,272,355 B2
(45) Date of Patent: Apr. 8, 2025

(54) SYSTEM AND METHOD FOR PROVIDING A VIRTUAL SPEECH AGENT FOR SIMULATED CONVERSATIONS AND CONVERSATIONAL FEEDBACK

(71) Applicant: Ashwarya Poddar, Kirkland, WA (US)

(72) Inventor: Ashwarya Poddar, Kirkland, WA (US)

(73) Assignee: ConverzAI, Inc., Redmond, WA (US)

( * ) Notice: Subject to any disclaimer, the term of this patent is extended or adjusted under 35 U.S.C. 154(b) by 280 days.

(21) Appl. No.: 17/725,446

(22) Filed: Apr. 20, 2022

(65) Prior Publication Data
US 2022/0335940 A1    Oct. 20, 2022

Related U.S. Application Data

(60) Provisional application No. 63/176,985, filed on Apr. 20, 2021.

(51) Int. Cl.
G10L 15/22     (2006.01)
H04M 3/527    (2006.01)
H04M 3/53     (2006.01)

(52) U.S. Cl.
CPC ............. *G10L 15/22* (2013.01); *H04M 3/527* (2013.01); *H04M 3/53* (2013.01); *G10L 2015/221* (2013.01); *G10L 2015/225* (2013.01)

(58) Field of Classification Search
CPC ............. G10L 15/22; G10L 2015/221; G10L 2015/225; H04M 3/527; H04M 3/53; H04M 3/5175; H04M 2203/403; G09B 19/04
See application file for complete search history.

(56) References Cited

U.S. PATENT DOCUMENTS

| 10,313,521 | B2 * | 6/2019 | Konig | G06F 40/30 |
| 10,770,059 | B2 * | 9/2020 | Scodary | G10L 13/00 |
| 2011/0150189 | A1 * | 6/2011 | Kulkarni | H04M 3/5175 379/32.01 |

* cited by examiner

*Primary Examiner* — Pierre Louis Desir
*Assistant Examiner* — Kristen Michelle Masters
(74) *Attorney, Agent, or Firm* — Plager Schack LLP; Mark H. Plager, Esq.; Stephen Hallberg, Esq.

(57) ABSTRACT

A system for improving conversational skills using a virtual speech agent is disclosed, including a virtual speech agent to execute a phone call between the virtual agent and a user. The virtual speech agent and user engage in a back-and-forth conversation, wherein the virtual speech agent generates a summary and a feedback report in view of the conversation.

10 Claims, 3 Drawing Sheets

SYSTEM AND METHOD FOR PROVIDING A VIRTUAL SPEECH AGENT FOR SIMULATED CONVERSATIONS AND CONVERSATIONAL FEEDBACK

CROSS-REFERENCE TO RELATED APPLICATIONS

The present application claims priority to U.S. Provisional Patent Application No. 63/176,985 filed Apr. 20, 2021, entitled "SYSTEM AND METHOD FOR PROVIDING A VIRTUAL SPEECH AGENT FOR SIMULATED CONVERSATIONS AND CONVERSATIONAL FEEDBACK" which is hereby incorporated by reference in its entirety.

TECHNICAL FIELD

The embodiments generally relate to computerized systems for improving conversational skills using a virtual speech agent.

BACKGROUND

Few conversations have a significant impact on our lives, be it professional conversations, such as job or university interviews, promotion discussions, big customer sales meetings or personal conversations such as a first date. The fundamental way to do well in such crucial conversations is to practice the conversation by anticipating the questions and preparing your answers for those questions. A mock conversation with a friend or colleague is most beneficial as one can not only experience a simulation of the real conversation but also receive feedback from their peers. Unfortunately, not everyone feels comfortable having such a conversation with a third person. A friend or colleague might not have the time to conduct the mock conversation and may be incapable of providing meaningful feedback.

Virtual speech agents are used to conduct conversations in lieu of providing direct contact with a live human. These systems are designed to simulate the way a human would behave as a conversational partner. The virtual speech agent that can simulate these crucial conversations and provide feedback to solve this problem. In addition, triggered by the initial responses, the virtual speech agent can ask dynamic follow up questions. Answering these follow up questions are usually the most difficult part and preparing well for these can significantly impact the outcomes of the crucial conversations.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments provided herein relate to a system for improving conversational skills using a virtual speech agent. The system includes a virtual speech agent to execute a phone call between the virtual agent and a user. The virtual speech agent and user engage in a back-and-forth conversation, wherein the virtual speech agent generates a summary and a feedback report in view of the conversation.

The system allows for a user to experience a simulated conversation with a virtual speech agent to prepare for a human-to-human interaction. The user may practice conversations which they may experience during a job interview, promotion conversation, pay raise negotiation, matrimonial discussion, recruiter conversation, sales pitch conversation, healthcare professional and patient interaction, and the like.

In one aspect, the conversation may be server-based or app-based. The system may include voice conversations, video conversations, and/or conversation on a smart device (e.g., a text conversation).

In one aspect, the summary of the conversation may include a critique of one or more components of the conversation.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
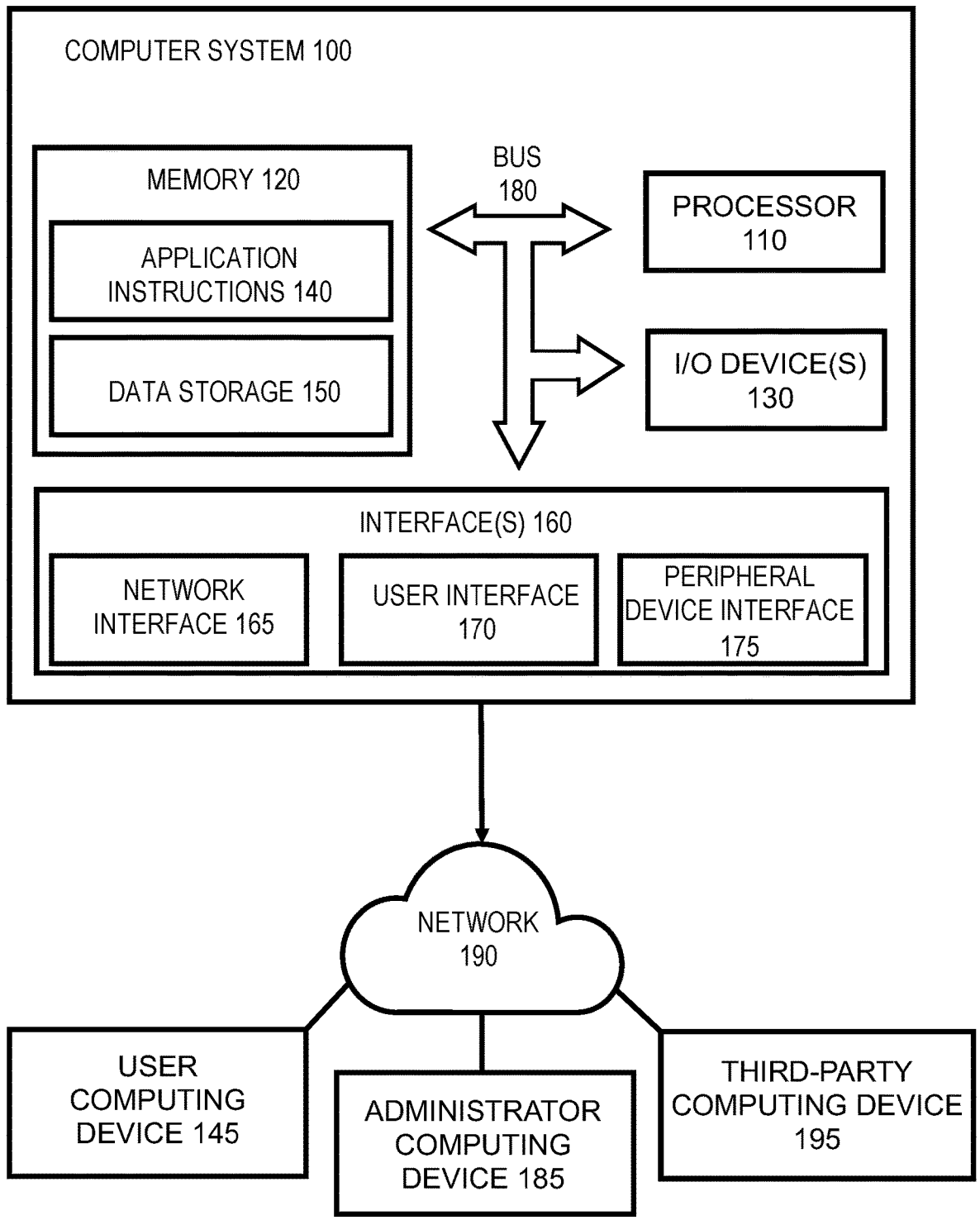
FIG. 1 illustrates a block diagram of the computer system, according to some embodiments.

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this disclosure, the various embodiments may be a system, method, and/or computer program product at any possible technical detail level of integration. A computer program product can include, among other things, a computer-readable storage medium having computer-readable program instructions thereon for causing a processor to carry out aspects of the present disclosure.

In general, the embodiments described herein relate to a system for the improving conversational skills using a virtual speech agent. In use, the virtual speech agent (or bot) makes a phone call to the user on their phone (e.g., a smartphone or similar communications device). Once in communication, the virtual speech agent and user may then have a conversation including back-n-forth dialogue including contextual follow up questions based on the response quality of the user's previous response. For example, in an interview scenario, the virtual speech agent will act as a recruiter who makes an interview phone call to a candidate. The virtual speech agent provides end-to-end dialog practice and speech-based opportunities that only humans (i.e., the recruiters in the current example) can deliver in the current arts. At the end of the conversation, the user (i.e., the candidate in the current example) can review a feedback report from the conversation and use this to improve their responses. The feedback report provides insights into the quality of response, completeness of the response, as well as their style of communication. Instead of a phone call, the automatic yet realistic bot can be applied for a simulated conversation on a smart device that has an existing speech assistant facility or on a mobile phone, tablet where the speech bot can surface through a mobile app.

In some embodiments, the system may utilize a video call. In such, the feedback report will also contain inputs related to the facial expression of the during the video conversation.

As used herein, the term "conversational skills" may relate to the ability to form and deliver speech or communications during a conversation, the content of the conversation, and the presentation of the conversation. The term "conversation" may relate to spoken conversations as well as digitally transmitted conversations.

The system may be used in various simulated scenarios by individuals for practicing crucial conversations such as customer pitches, promotion discussion, matrimonial conversation, salary negotiation and also for different businesses for trainings such as salesperson or customer service training, recruiter training, healthcare professional training for interacting with a patient, etc.

In some embodiments, the conversation practice can be either server-based or app-based. In a server-based configuration, practice conversation tasks (e.g., interview questions) are stored on the server. At the end of the dialog, the virtual speech agent summarizes and rates the call. In the example of an interview practice app, the hiring decision and the interview summary are sent back to the candidate as feedback inside the app. In some embodiments, the system may generate critiques of conversation components and transmit the critiques to the user.

In the client-based approach, all of the conversation questions (such as interview questions), rules and code for an agent to generate the contextual follow up questions are downloaded to the client app. Similar to the video games, the app hosts the dialog on the client to interact with the user.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 150, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The user computing device 145 may be utilized by a user to interact with the various functionalities described herein. The administrator computing device 185 is utilized by an administrative user to moderate content and to perform other administrative functions. The third-party computing device 195 may include any third-party in communication with the system.

Figure 2:
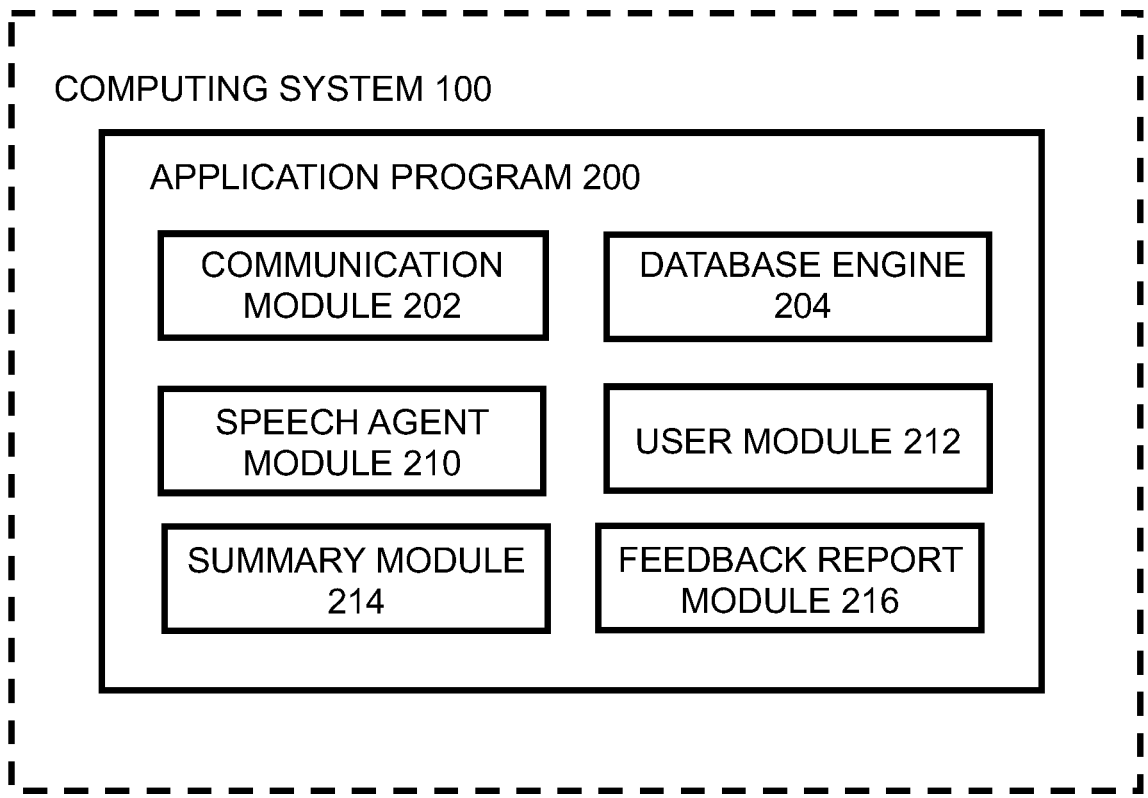
FIG. 2 illustrates a block diagram of an application program operated by the computing system, according to some embodiments.

FIG. 2 illustrates an example computer architecture for the application program 200 operated via the computing system 100. The computer system 100 comprises several modules and engines configured to execute the functionalities of the application program 200, and a database engine 204 configured to facilitate how data is stored and managed in one or more databases. In particular, FIG. 2 is a block diagram showing the modules and engines needed to perform specific tasks within the application program 200.

Referring to FIG. 2, the computing system 100 operating the application program 200 comprises one or more modules having the necessary routines and data structures for performing specific tasks, and one or more engines configured to determine how the platform manages and manipulates data. In some embodiments, the application program 200 comprises one or more of a communication module 202, a database engine 204, a speech agent module 210, a user module 212, a summary module 214, and a feedback report module 216.

In some embodiments, the communication module 202 is configured for receiving, processing, and transmitting a user command and/or one or more data streams. In such embodiments, the communication module 202 performs communication functions between various devices, including the user computing device 145, the administrator computing device 185, and a third-party computing device 195. In some embodiments, the communication module 202 is configured to allow one or more users of the system, including a third-party, to communicate with one another. In some embodiments, the communications module 202 is configured to maintain one or more communication sessions with one or more servers, the administrative computing device 185, and/or one or more third-party computing device(s) 195.

In some embodiments, the communication module 202 is operable to execute a phone call between the virtual agent and the user. The communication module 202 may simulate a back-and-forth conversation (i.e., a conversation between the user and virtual agent).

In some embodiments, a database engine 204 is configured to facilitate the storage, management, and retrieval of data to and from one or more storage mediums, such as the one or more internal databases described herein. In some embodiments, the database engine 204 is coupled to an external storage system. In some embodiments, the database engine 204 is configured to apply changes to one or more databases. In some embodiments, the database engine 204 comprises a search engine component for searching through thousands of data sources stored in different locations.

In some embodiments, the speech agent module 210 is operable to communicate with a user, generate a summary, and generate a feedback report in view of a conversation performed between the user and the speech agent.

In some embodiments, the user module 212 facilitates the creation of a user account for the application system. The user module 212 may allow the user to create a user profile which includes user information, user preferences, establish user credentials, and the like.

In some embodiments, the summary module 214 is in operable communication with the computing system and speech agent module 210 to facilitate the generation of a summary from a conversation executed by the user with the speech agent.

In some embodiments, the feedback report module 216 is in operable communication with the computing system and speech agent module 210 to facilitate the generation of a feedback report from a conversation executed by the user with the speech agent.

Figure 3:
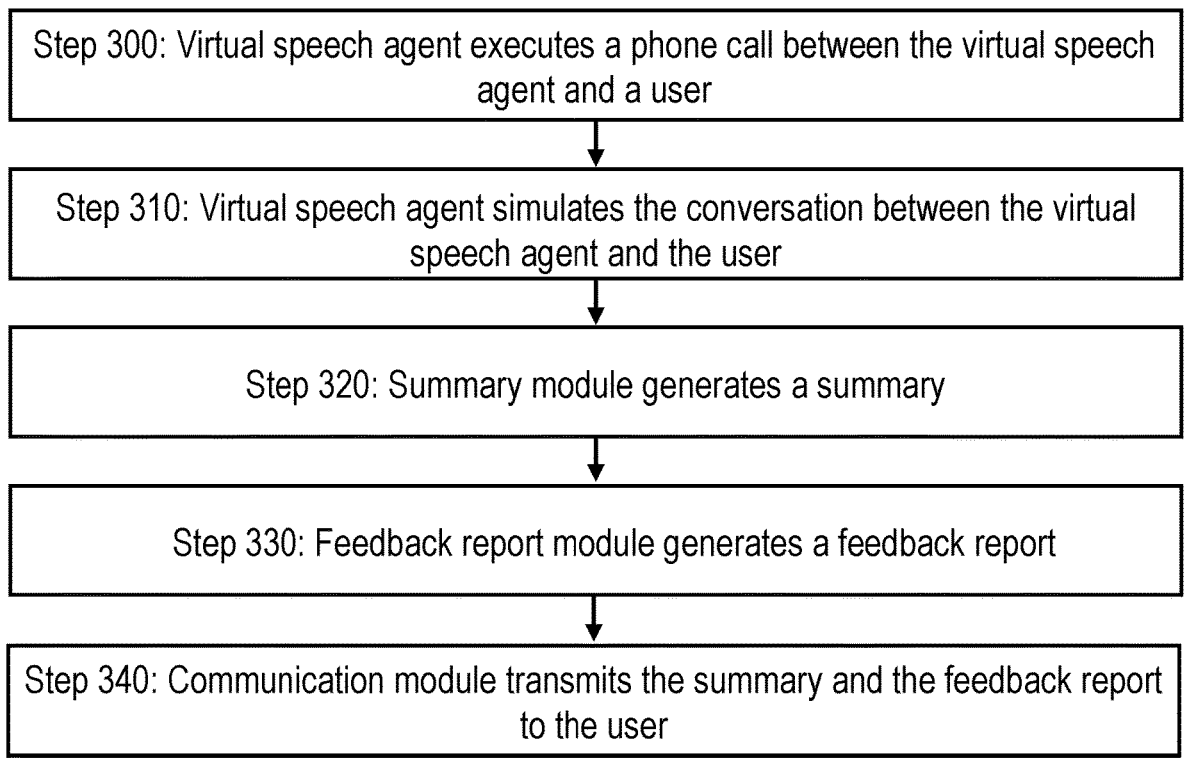
FIG. 3 illustrates a flowchart of a method for providing a virtual speech agent for simulated conversations, according to some embodiments.

FIG. 3 illustrates a flowchart of a method for improving conversational skills using a virtual speech agent. In step 300, the virtual speech agent executes a phone call between a virtual speech agent and a user. In step 310, the virtual speech agent simulated the conversation and in step 320 a summary is generated by a summary module. The summary includes a transcript of the conversation. In step 330, the feedback report module generates a feedback report which analyzes the conversation and provides feedback to aid in the improvement of the user's conversational skills. In step 340, the feedback report and summary are transmitted to the user.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the arts.

What is claimed is:

1. A system for improving conversational skills using a virtual speech agent, the system comprising:
   a server computer system comprising a processor, a memory, a network interface, a user interface, and a data storage that stores conversation task data comprising a plurality of conversation tasks;
   a user computing device operable by a user, wherein the user computing device is configured to (i) connect, over a network, to the server computer system via the network interface and, after establishing the connection to the server computer system, (ii) access the user interface to fetch and load the conversation task data;
   an application program comprising application instructions, wherein the application program is stored in the data storage of the server computer system, wherein the application program is configured to execute the application instructions on the processor when the application program is loaded from memory to facilitate improvement of conversation skills by a user, wherein the application program comprises (i) a communication module that is configured to establish a call connection with a user device operated by the user, (ii) a speech agent module of the application program that is configured to perform simulated conversation analysis based on conversation responses of the user, (iii) a summary module, and (iv) a feedback report module; and
   a virtual speech agent of the application program, wherein the virtual speech agent is configured to utilize the communication module to establish a call with the user and utilize the speech agent module to engage the user in a back-and-forth vocal conversation during the call with the user through the user interface when the application program is running on the processor of the server computer system, wherein the back-and-forth vocal conversation is based on the conversation task data loaded by the user computing device, wherein the virtual speech agent is configured to utilize the speech agent module agent while in operable communication with the user during the back-and-forth vocal conversation, wherein the speech agent module is configured to perform simulated conversation analysis based on conversation responses of the user, wherein the virtual speech agent is further configured to utilize the summary module to generate a summary of the back-and-forth vocal conversation and utilize the feedback report module to generate a feedback report of the back-and-forth vocal conversation, wherein the summary module is in operable communication with the speech agent module to facilitate the generation of real time summary information during the back-and-forth vocal conversation and generation of the summary when the application program is running on the computer system and after the communication module disconnects the call connection with the user computing device after the back-and-forth vocal conversation is completed.

2. The system of claim 1, wherein the back-and-forth vocal conversation comprises at least one of a simulated interview conversation, a simulated promotion conversation, a simulated matrimonial conversation, a simulated sales pitch conversation, a simulated conversation involving a healthcare interaction, a simulated customer pitch conversation, a simulated conversation involving a customer service training procedure, a simulated conversation involving a salesperson training procedure, a simulated conversation involving a recruiter training procedure, a simulated conversation involving a healthcare professional training procedure, a simulated career discussion conversation, a simulated customer presentation, a simulated professional one-on-one conversation, and a simulated recruiter conversation.

3. The system of claim 1, wherein the back-and-forth vocal conversation comprises a server-based conversation wherein the user computing device comprises a smart device operated by the user.

4. The system of claim 1, wherein the feedback report module is in operable communication with the speech agent module to facilitate the generation of real time feedback during the back-and-forth vocal conversation and generation of the feedback report when the application program is running on the computer system and after the communication module disconnects the call connection with the user computing device after the back-and-forth vocal conversation is completed.

5. A system for improving conversational skills using a virtual speech agent, the system comprising:
   a database engine of an application program that is communicably connected to a data storage that stores conversation task data comprising a plurality of conversation tasks;
   a speech agent module of the application program that is configured to perform simulated conversation analysis based on the conversation task data and one or more conversation responses of a user engaged in a back-and-forth vocal conversation, wherein the speech agent module is in operable communication with the user during the back-and-forth vocal conversation, wherein the speech agent module is configured to perform simulated conversation with the user based on the simulated conversation analysis;
   a virtual speech agent of the application program that is configured to conduct a phone call to engage the user in the back-and-forth vocal conversation between the virtual speech agent and the user, wherein the virtual speech agent and user engage in a simulated conversation based on the conversation task data during the phone call, wherein the virtual speech agent makes real time adjustments to questions and responses in the back-and-forth vocal conversation which deviate from the conversation task data to maintain a suitable conversation flow of questions and responses, wherein the real time adjustments to the questions and responses are based on the conversation analysis performed by the speech agent module, wherein the virtual speech agent generates a summary and a feedback report in view of the simulated conversation after the phone call is over between the virtual speech agent and the user;
   a summary module of the application program that is in operable communication with the speech agent module to facilitate the generation of the summary;
   a feedback report module of the application program that is in operable communication with the speech agent module to facilitate the generation of the feedback report; and
   a communication module of the application program that is configured to transmit communication information between the user and the virtual speech agent during the simulated conversation and transmit the summary and the feedback report, generated by the virtual speech agent, to the user after the phone call is over.

6. The system of claim 5, wherein the conversation comprises at least one of a simulated interview conversation, a simulated promotion conversation, a simulated matrimonial conversation, a simulated sales pitch conversation, a simulated conversation involving a healthcare interaction, a simulated customer pitch conversation, a simulated conversation involving a customer service training procedure, a simulated conversation involving a salesperson training procedure, a simulated conversation involving a recruiter training procedure, a simulated conversation involving a healthcare professional training procedure, a simulated career discussion conversation, a simulated customer presentation, a simulated professional one-on-one conversation, and a simulated recruiter conversation.

7. The system of claim 5, wherein the conversation comprises at least one of a server-based conversation, an app-based conversation, a web-based conversation, a voice conversation, a video conversation, and a text conversation on a device operated by the user.

8. A method for improving conversational skills using a virtual speech agent, the method comprising the steps of:
   executing, via a virtual speech agent of an application program that is running on a computer system, a phone call between the virtual speech agent and a user, wherein the phone call is established by a communication module communicably connected to the virtual speech agent connecting the computer system to a user device over an audio channel;
   engaging, by the virtual speech agent, in a simulated conversation between the virtual speech agent and the user, wherein the simulated conversation is focused on a conversation topic, wherein engaging in the simulated conversation comprises performing, by a speech agent module of the application program that is accessible to the virtual speech agent and is in operable communication with the user, simulated conversation with the user based on conversation task data;
   generating, via a summary module of the application program that is communicably connected to the virtual speech agent, a summary of the simulated conversation after the phone call between the virtual speech agent and the user is completed, wherein the phone call between the virtual speech agent and the user is completed when the communication module disconnects the computer system from the user device over the audio channel, wherein the summary module is in operable communication with the speech agent module to facilitate the generation of the summary with a rating of the conversation;
   generating, via a feedback report module of the application program that is communicably connected to the summary module and the virtual speech agent, a feedback report of conversation performance by the user during the simulated conversation, wherein the feedback report is generated after the phone call between the virtual speech agent and the user is completed, wherein the feedback report module is in operable communication with the speech agent module to facilitate the generation of the feedback report with a performance critique of the user in the conversation; and
   transmitting, by the communication module, the summary with the rating of the conversation and the feedback report with the performance critique of the user in the conversation to the user device of the user.

9. The method of claim 8, wherein the conversation topic comprises at least one of a simulated interview conversation, a simulated promotion conversation, a simulated matrimonial conversation, a simulated sales pitch conversation, a simulated conversation involving a healthcare interaction, a simulated customer pitch conversation, a simulated conversation involving a customer service training procedure, a simulated conversation involving a salesperson training procedure, a simulated conversation involving a recruiter training procedure, a simulated conversation involving a healthcare professional training procedure, a simulated career discussion conversation, a simulated customer presentation, a simulated professional one-on-one conversation, and a simulated recruiter conversation.

10. The method of claim 8, wherein the simulated conversation comprises at least one of a server-based conversation, an app-based conversation, a web-based conversation, a voice conversation, a video conversation, and a text conversation on a smart device operated by the user.

* * * * *